United States Patent
Ogawa

(10) Patent No.: US 8,197,977 B2
(45) Date of Patent: Jun. 12, 2012

(54) FUEL CELL SYSTEM WITH IMPROVED FLUID UNIT CONFIGURATION

(75) Inventor: Tetsuya Ogawa, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 725 days.

(21) Appl. No.: 12/301,403

(22) PCT Filed: May 16, 2007

(86) PCT No.: PCT/JP2007/060475
§ 371 (c)(1),
(2), (4) Date: Nov. 18, 2008

(87) PCT Pub. No.: WO2007/136079
PCT Pub. Date: Nov. 29, 2007

(65) Prior Publication Data
US 2009/0208800 A1 Aug. 20, 2009

(30) Foreign Application Priority Data
May 18, 2006 (JP) .................................. 2006-138609

(51) Int. Cl.
*H01M 8/04* (2006.01)
(52) U.S. Cl. ........................ 429/441; 429/433; 429/442
(58) Field of Classification Search .................. 429/441, 429/433, 442
See application file for complete search history.

(56) References Cited

U.S. PATENT DOCUMENTS

| | | | | |
|---|---|---|---|---|
| 5,532,073 A * | 7/1996 | Hirata et al. | ................... | 429/460 |
| 5,998,053 A * | 12/1999 | Diethelm | ....................... | 429/429 |
| 6,638,653 B2 * | 10/2003 | Andou et al. | ................... | 429/423 |
| 7,625,657 B2 * | 12/2009 | Tsunoda et al. | ............... | 429/483 |
| 7,914,937 B2 * | 3/2011 | Tsunoda et al. | ............... | 429/457 |
| 2001/0014301 A1* | 8/2001 | Nakamura et al. | ............ | 422/198 |
| 2004/0146763 A1 | 7/2004 | Pondo et al. | | |
| 2007/0224469 A1* | 9/2007 | Isozaki et al. | ................... | 429/20 |
| 2009/0208799 A1* | 8/2009 | Homma | ......................... | 429/26 |
| 2009/0263689 A1* | 10/2009 | Homma | ......................... | 429/19 |

FOREIGN PATENT DOCUMENTS

| | | |
|---|---|---|
| EP | 0814526 A1 | 12/1997 |
| JP | 2004-284901 | 10/2004 |
| JP | 2005-166439 | 6/2005 |
| WO | WO-01/95409 A2 | 12/2001 |

OTHER PUBLICATIONS

Japanese Office Action for Application No. 2006-138609, dated Nov. 15, 2011.

* cited by examiner

*Primary Examiner* — Tho D Ta
(74) *Attorney, Agent, or Firm* — Nelson Mullins Riley & Scarborough LLP; Anthony A. Laurentano

(57) ABSTRACT

A fuel cell system includes a fuel cell stack, a heat exchanger, an evaporator, a reformer, and a combustor. A fluid unit including at least the heat exchanger, the evaporator, and the reformer is provided at one end of the fuel cell stack in a stacking direction. The combustor is provided inside the evaporator The combustor has a combustion gas path for discharging a combustion gas produced in the combustor. The reformer is provided at a position in the middle of the combustion gas path.

7 Claims, 7 Drawing Sheets

US 8,197,977 B2

FUEL CELL SYSTEM WITH IMPROVED FLUID UNIT CONFIGURATION

RELATED APPLICATIONS

This application is a 35 U.S.C. 371 national stage filing of International Application No. PCT/JP2007/060475, filed 16 May 2007, which claims priority to Japan Patent Application No. 2006-138609 filed on 18 May 2006 in Japan. The contents of the aforementioned applications are hereby incorporated by reference.

TECHNICAL FIELD

The present invention relates to a fuel cell system including a fuel cell stack formed by stacking a plurality of fuel cells. Each of the fuel cells is formed by stacking an electrolyte electrode assembly and a separator. The electrolyte electrode assembly includes an anode, a cathode, and an electrolyte interposed between the anode and the cathode.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly (membrane electrode assembly). The electrolyte electrode assembly is interposed between separators (bipolar plates). In use, generally, predetermined numbers of the electrolyte electrode assemblies and the separators are stacked together to form a fuel cell stack.

In the fuel cell stack, the operating temperature of the fuel cell is high, about 800° C. Therefore, at the time of starting operation of the fuel cell stack, it is desirable to heat the fuel cell stack to a desired temperature rapidly using a combustor. Normally, the combustor is provided on a side of the fuel cell stack where the oxygen-containing gas is supplied, or on a side of the fuel cell stack where the exhaust gas is discharged.

However, in the structure where the combustor is provided on the side where the oxygen-containing gas is supplied, the hot combustion gas produced by combustion in the combustor directly flows into the fuel cell stack. Therefore, the separators tend to be corroded easily by the hot combustion gas, and carbon in the combustion gas adheres to the separators or the membrane electrode assembly.

In an attempt to address the problems, structure of providing the combustor on the side of the fuel stack where the exhaust gas is discharged may be adopted. For example, Japanese Laid-Open Patent Publication No. 2005-166439 discloses a fuel cell system as shown in FIG. 7. The fuel cell system includes a fuel cell 1 having an air electrode 1a and a fuel electrode 1b. The air 2 as an oxygen-containing gas is supplied to the air electrode 1a, and a fuel gas 3 is supplied to the fuel electrode 1b.

On the side of the fuel cell 1 where the off gas is discharged from the fuel electrode 1b, an exhaust gas combustor 4 for burning the off gas is provided, and the combustion gas discharged from the exhaust gas combustor 4 is supplied to a heat exchanger 5, and the air 2 is heated before it is supplied to the air electrode 1a. In a supply line of the fuel gas 3, a start up combustor 6 for supplying the reducing gas produced during the system start-up by incomplete combustion to the fuel electrode 1b is provided.

However, in the conventional technique, since the two combustors, i.e., the exhaust gas combustor 4 and the start up combustor 6 are provided in the fuel cell system, the overall size of the fuel cell system is large. Further, the exhaust gas combustor 4 is provided in the exhaust gas path of the fuel cell 1, and always exposed to the hot exhaust gas. Thus, durability of the exhaust gas combustor 4 is lowered. Further, at the time of starting operation of the fuel cell system, because the temperature of the exhaust gas discharged from the fuel cell fluctuates, it is extremely difficult to maintain the temperature of the exhaust combustion gas discharged from the exhaust gas combustor 4 in a certain range of the temperature.

DISCLOSURE OF INVENTION

The present invention solves the above problems, and an object of the present invention is to provide a fuel cell system having simple structure in which durability of the combustor is improved effectively, and heat efficiency is improved suitably.

The present invention relates to a fuel cell system including a fuel cell stack, a heat exchanger, an evaporator, a reformer, and a combustor. The fuel cell stack is formed by stacking a plurality of fuel cells in a stacking direction. Each of the fuel cells is formed by stacking an electrolyte electrode assembly and a separator. The electrolyte electrode assembly includes an anode, a cathode, and an electrolyte interposed between the anode and the cathode. The heat exchanger heats an oxygen-containing gas using a heat medium before the oxygen-containing gas is supplied to the fuel cell stack. The evaporator vaporizes water to produce a mixed fuel of a raw fuel chiefly containing hydrocarbon and water vapor. The reformer performs steam reforming using the water vapor and the raw fuel to produce a fuel gas to be supplied to the fuel cell stack. The combustor burns the raw fuel to produce a combustion gas.

A fluid unit including at least the heat exchanger, an evaporator, and the reformer is provided at one end of the fuel cell stack in the stacking direction, and the combustor is provided inside the evaporator. The combustor has a combustion gas path for discharging the combustion gas produced in the combustor, and the reformer is provided at a position in the middle of the combustion gas path.

According to the present invention, the combustion gas produced in the combustor is provided to the reformer disposed at a position in the middle of the combustion gas path. Therefore, the reformer is heated rapidly. Further, the combustor is provided inside the evaporator. In the structure, the evaporator is heated by heat radiated from the combustor. Accordingly, the reformer and the evaporator are promptly placed into their active states where reforming can be performed desirably. It is possible to suitably start operation of the fuel cell stack.

Further, the fluid unit is provided at one end of the fuel cell stack in the stacking direction, and the combustor is provided inside the evaporator of the fluid unit. In the structure, the fuel cell stack is heated from the inside owing to the combustor. Improvement in the heat efficiency is achieved advantageously.

BEST MODE FOR CARRYING OUT THE INVENTION

Figure 1:
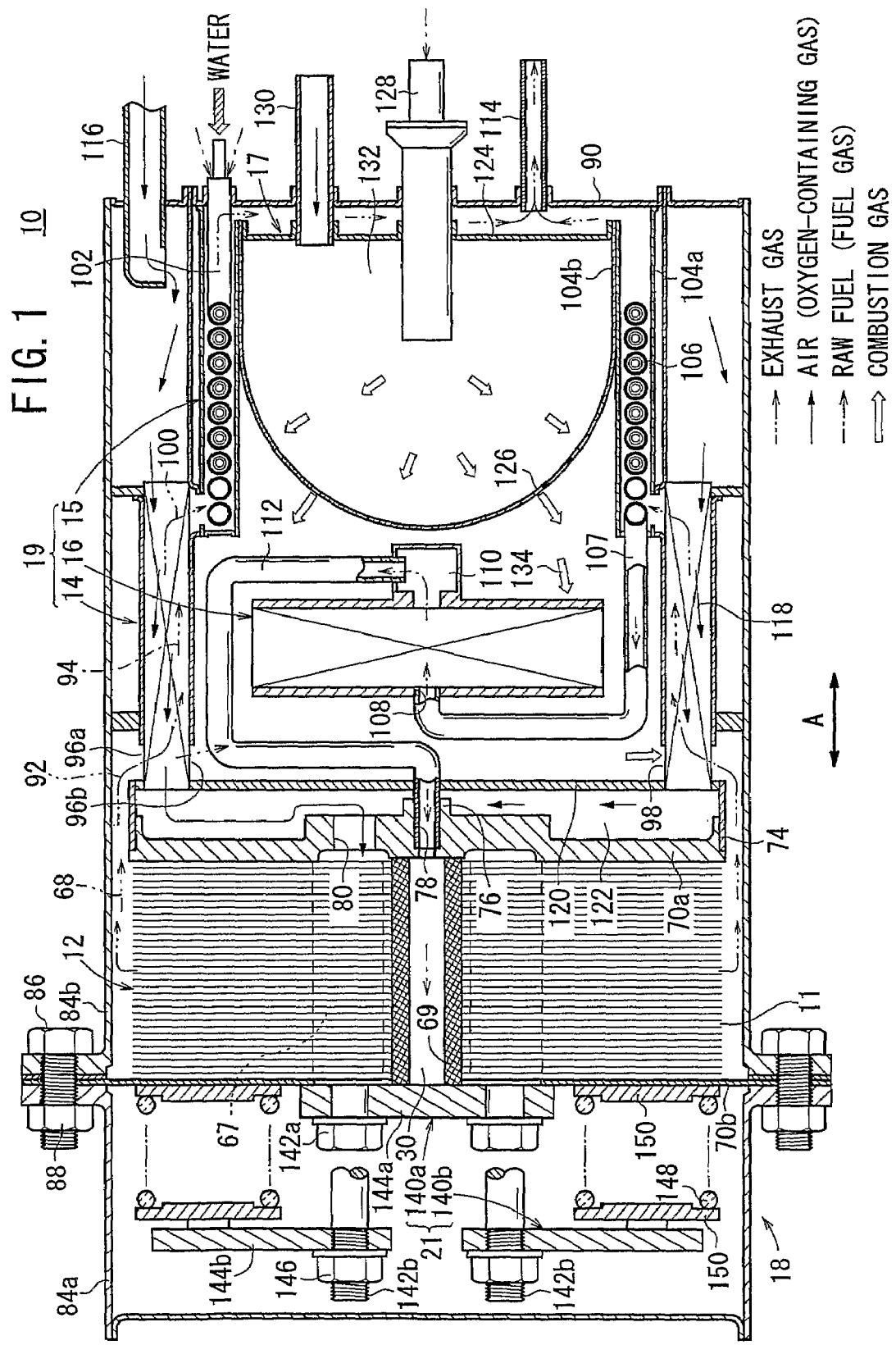
FIG. 1 is a partial cross sectional view showing a fuel cell system according to an embodiment of the present invention.
Figure 2:
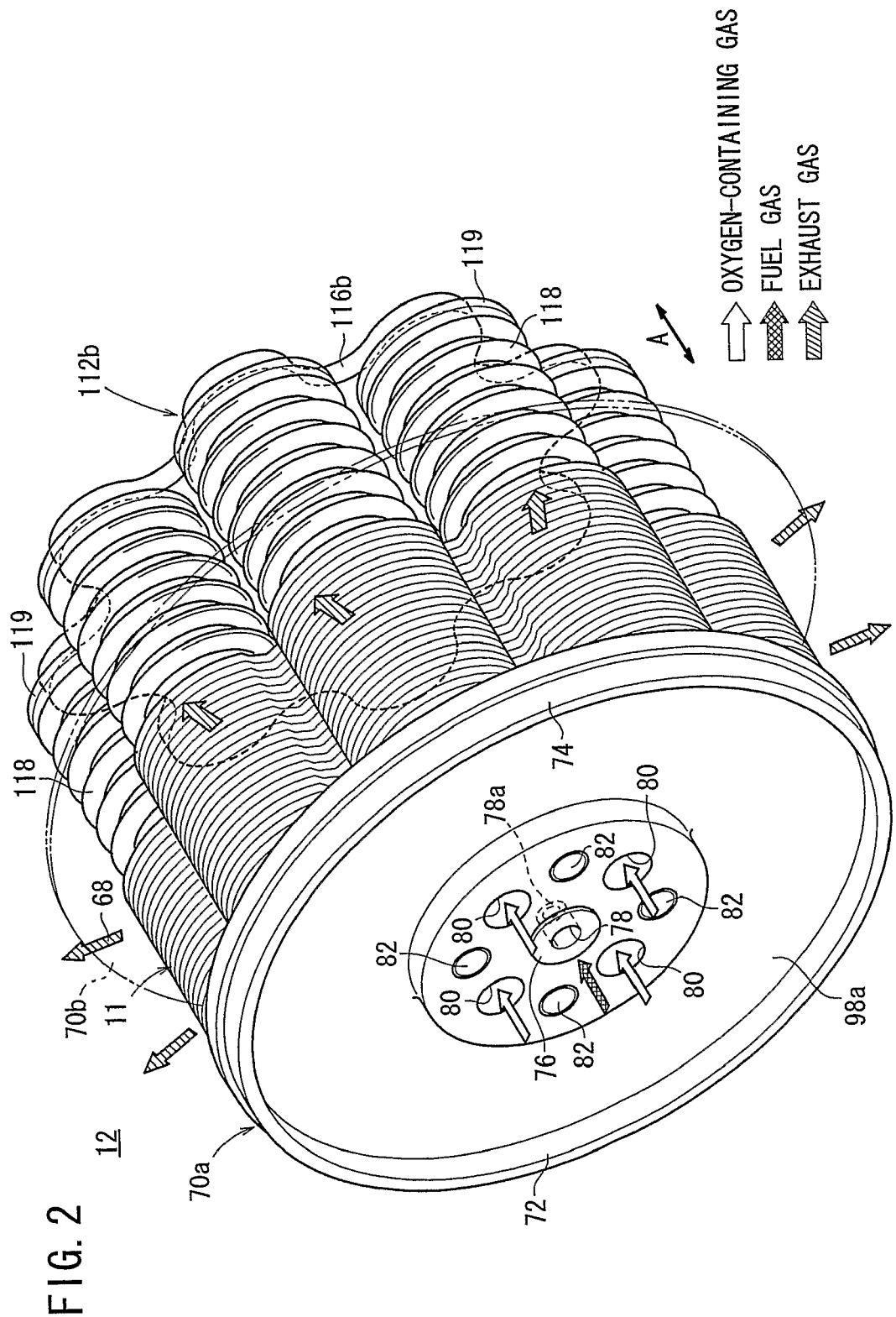
FIG. 2 is a perspective view schematically showing a fuel cell stack of the fuel cell system.

FIG. 1 is a partial cross sectional view showing a fuel cell system 10 according to an embodiment of the present invention. FIG. 2 is a perspective view schematically showing a fuel cell stack 12 formed by stacking a plurality of fuel cells 11 of the fuel cell system 10 in a direction indicated by an arrow A.

The fuel cell system 10 is used in various applications, including stationary and mobile applications. For example, the fuel cell system 10 is mounted on a vehicle. As shown in FIG. 1, the fuel cell system 10 includes a fuel cell stack 12, a heat exchanger 14, an evaporator 15, a reformer (or preliminary reformer) 16, a combustor 17, and a casing 18. The heat exchanger 14 heats an oxygen-containing gas before it is supplied to the fuel cell stack 12. The evaporator 15 evaporates water. The reformer 16 uses water vapor (steam) and a raw fuel (e.g., city gas) chiefly containing hydrocarbon for steam reforming of the raw fuel. The combustor 17 burns the raw fuel to produce a combustion gas. The fuel cell stack 12, the heat exchanger 14, the evaporator 15, the reformer 16, and the combustor 17 are disposed in the casing 18.

In the casing 18, a fluid unit 19 including at least the heat exchanger 14 and the reformer 16 is disposed on one side of the fuel cell stack 12 in the stacking direction, and a load applying mechanism 21 for applying a tightening load to the fuel cells 11 in the stacking direction indicated by the arrow A is disposed on the other side of the fuel cell stack 12 in the stacking direction. The fluid unit 19, the combustor 17, and the load applying mechanism 21 are provided symmetrically with respect to the central axis of the fuel cell stack 12.

In the fluid unit 19, the substantially cylindrical reformer 16 is provided inside the ring shaped heat exchanger 14, near the fuel cell stack 12. The reformer 16 and the evaporator 15 are provided adjacent to each other in the direction indicated by the arrow A. The combustor 17 is provided inside the evaporator 15.

Figure 3:
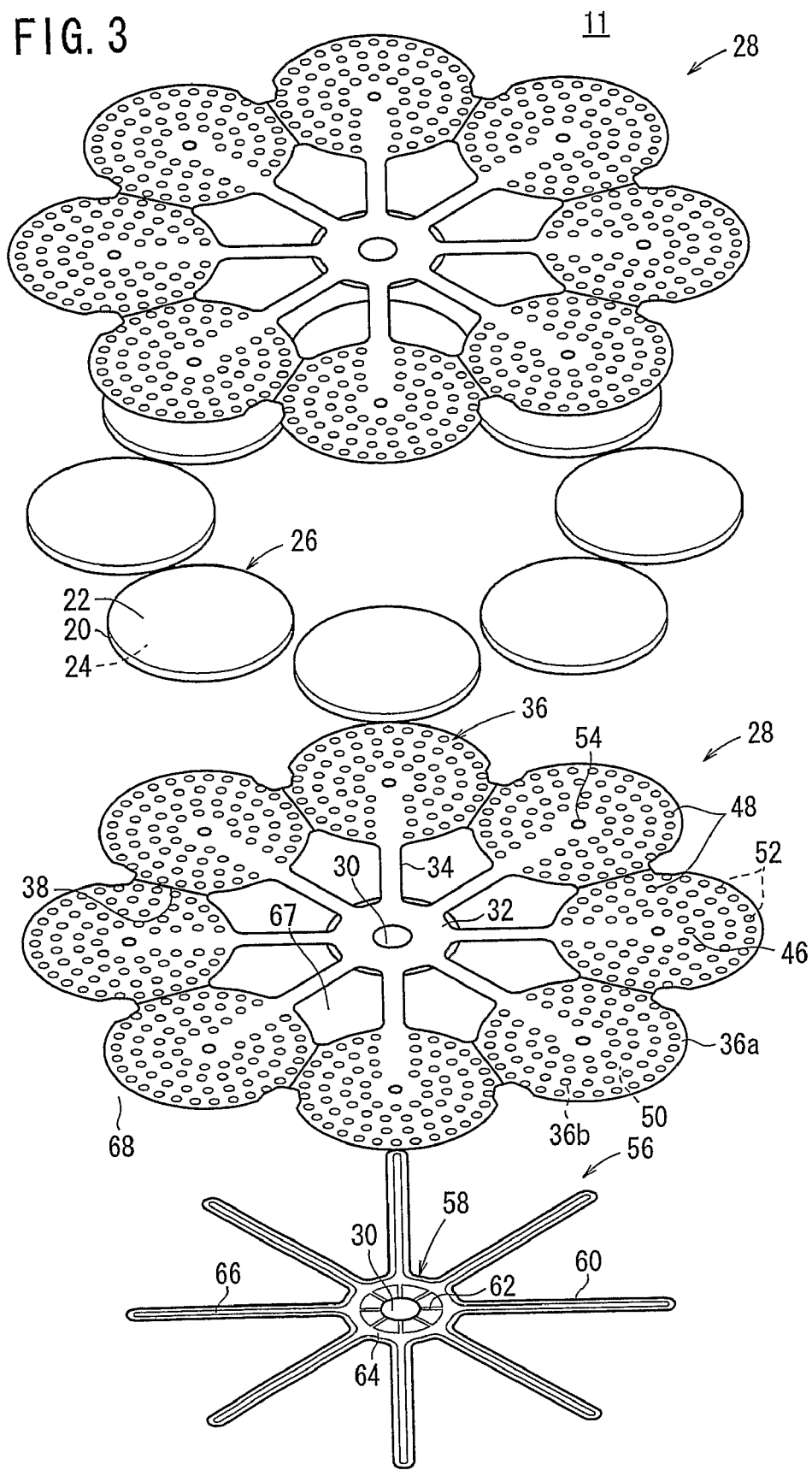
FIG. 3 is an exploded perspective view showing a fuel cell of the fuel cell stack.

The fuel cell 11 is a solid oxide fuel cell (SOFC). As shown in FIG. 3, the fuel cell 11 includes electrolyte electrode assemblies 26 each having a circular disk shape. Each of the electrolyte electrode assemblies 26 includes a cathode 22, an anode 24, and an electrolyte (electrolyte plate) 20 interposed between the cathode 22 and the anode 24. A barrier layer (not shown) is provided at least at the inner circumferential edge of the electrolyte electrode assembly 26 (center of the separator 28) for preventing the entry of the oxygen-containing gas. For example, the electrolyte 20 is made of ion-conductive solid oxide such as stabilized zirconia.

A plurality of, e.g., eight electrolyte electrode assemblies 26 are sandwiched between a pair of separators 28 to form the fuel cell 11. The eight electrolyte electrode assemblies 26 are aligned along a virtual circle concentric with a fuel gas supply passage 30 extending through the center of the separators 28.

For example, each of the separators 28 comprises a single metal plate of, e.g., stainless alloy or a carbon plate. The separator 28 has a first small diameter end portion 32. The fuel gas supply passage 30 extends through the center of the first small diameter end portion 32. The first small diameter end portion 32 is integral with circular disks 36 each having a relatively large diameter through a plurality of first bridges 34. The first bridges 34 extend radially outwardly from the first small diameter end portion 32 at equal angles (intervals). The circular disk 36 and the electrolyte electrode assembly 26 have substantially the same size. The adjacent circular disks 36 are separated by a slit 38.

Each of the circular disks 36 has first protrusions 48 on its surface 36a which contacts the anode 24. The first protrusions 48 form a fuel gas channel 46 for supplying the fuel gas along an electrode surface of the anode 24. Further, each of the circular disks 36 has second protrusions 52 on its surface 36b which contacts the cathode 22. The second protrusions 52 form an oxygen-containing gas channel 50 for supplying the oxygen-containing gas along an electrode surface of the cathode 22.

Figure 4:
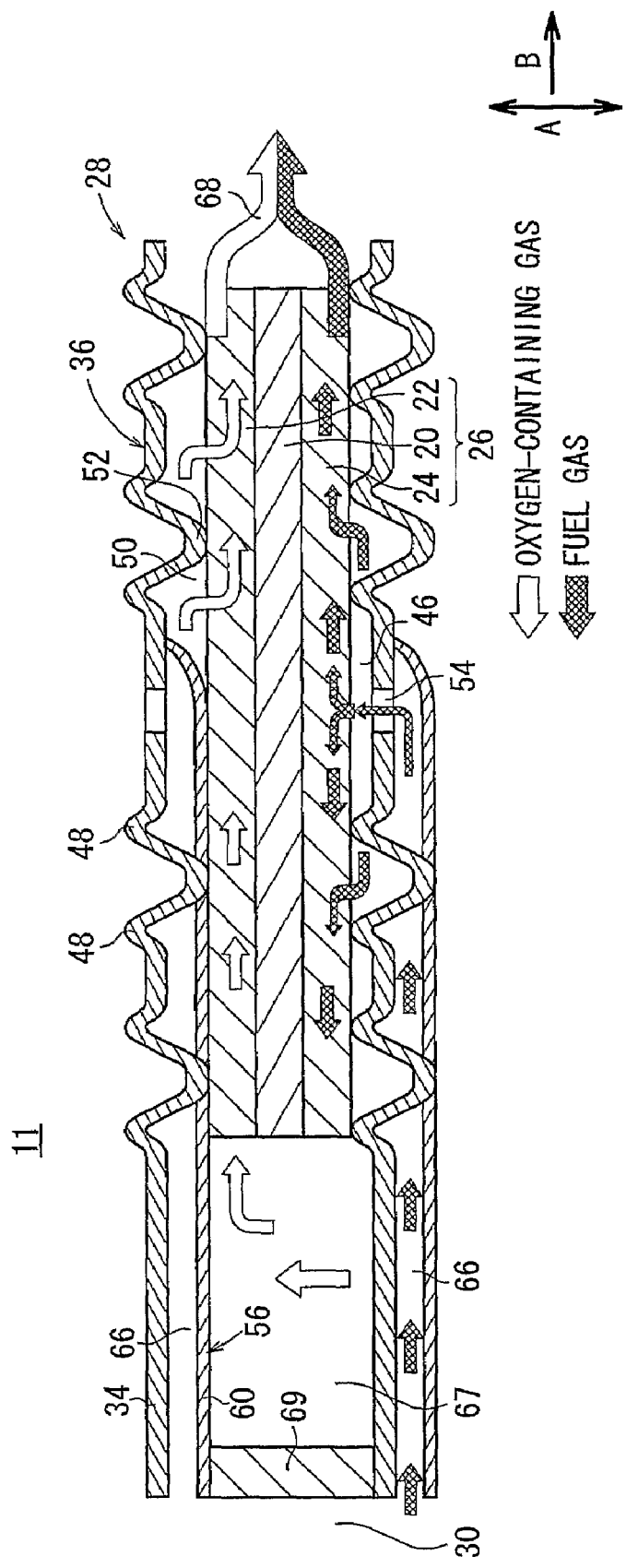
FIG. 4 is a cross sectional view schematically showing operation of the fuel cell.

As shown in FIG. 4, the first and second protrusions 48, 52 protrude in opposite directions. The first protrusions 48 are ring shaped protrusions, and the second protrusions 52 are mountain shaped protrusions. The second protrusions (mountain shaped protrusions) 52 are surrounded by the first protrusions (ring shaped protrusions) 48.

As shown in FIGS. 3 and 4, a fuel gas inlet 54 is provided in each of the circular disks 36 for supplying the fuel gas to the fuel gas channel 46. The position of the fuel gas inlet 54 is determined such that uniform distribution of the fuel gas is achieved. For example, the fuel gas inlet 54 is positioned at substantially the center of the circular disk 36.

A channel member 56 is fixed to the separator 28 by brazing or laser welding on a surface facing the cathode 22. As shown in FIG. 3, the channel member 56 includes a second small diameter end portion 58. The fuel gas supply passage 30 extends through the center of the second small diameter end portion 58. Eight second bridges 60 extend radially from the second small diameter end portion 58. Each of the second bridges 60 is fixed to the separator 28, from the first bridge 34 to the fuel gas inlet 54 of the circular disk 36.

A plurality of slits 62 are formed on the second small diameter end portion 58 of the channel member 56. The slits 62 are formed radially on a surface of the second small diameter end portion 58 which is joined to the separator 28. The slits 62 are connected to the fuel gas supply passage 30. Further, the slits 62 are connected to a recess 64 formed in the outer circumferential region of the second small diameter end portion 58. A fuel gas supply channel 66 is formed between the first and second bridges 34, 60. The fuel gas supply channel 66 is connected from the fuel gas supply passage 30 to the fuel gas channel 46 via the slits 62 and the recess 64 through the fuel gas inlet 54.

As shown in FIG. 4, the oxygen-containing gas channel 50 is connected to an oxygen-containing gas supply unit 67. The oxygen-containing gas is supplied in the direction indicated by the arrow B through the space between the inner circumferential edge of the electrolyte electrode assembly 26 and the inner circumferential edge of the circular disk 36. The oxygen-containing gas supply unit 67 extends in the stacking direction inside the circular disks 36 between the first bridges 34.

An insulating seal 69 for sealing the fuel gas supply passage 30 is provided between a pair of separators 28. For example, the insulating seal 69 is made of mica material, or ceramic material. An exhaust gas channel 68 is formed around the circular disks 36 of the fuel cells 11.

As shown in FIGS. 1 and 2, the fuel cell stack 12 includes a plurality of the fuel cells 11 stacked together, and end plates 70a, 70b provided at opposite ends in the stacking direction. Each of the end plates 70a, 70b has a substantially circular disk shape. A ring shaped portion 72 protrudes from the outer circumferential end of the end plate 70a, and a groove 74 is formed around the ring shaped portion 72. A columnar projection 76 is formed at the center of the ring shaped portion 72. The columnar projection 76 protrudes in the same direction as the ring shaped portion 72. A stepped hole 78 is formed at the center of the projection 76.

Holes 80 and screw holes 82 are formed in a same virtual circle around the projection 76. The holes 80 and the screw holes 82 are arranged alternately, and spaced at predetermined angles (intervals). As shown in FIG. 1, the diameter of the end plate 70b is larger than the diameter of the end plate 70a.

The casing 18 includes a first case unit 84a containing the load applying mechanism 21 and a second case unit 84b containing the fuel cell stack 12, the fluid unit 19, and the combustor 17. The end plate 70b and an insulating member are sandwiched between the first case unit 84a and the second case unit 84b. The insulating member is provided on the side of the second case unit 84b. The joint portion between the first case unit 84a and the second case unit 84b is tightened by screws 86 and nuts 88. A head plate 90 is fixed to the second case unit 84b through the heat exchanger 14.

The exhaust gas channel 68 is provided inside the second case unit 84b. The exhaust gas discharged from the outer ends of the stacked fuel cells 11 after consumption in the power generation flows through the exhaust gas channel 68. The exhaust gas channel 68 is connected to an exhaust gas path 92, and the exhaust gas path 92 is connected to an exhaust gas inlet 96a for supplying the exhaust gas (heat medium) into a heat medium channel 94. The heat exchanger 14 has an exhaust gas outlet 96b and a combustion gas inlet 98. Part of the exhaust gas supplied to the heat exchanger 14 is supplied through the exhaust gas outlet 96b to the reformer 16 as a heating source for heating the reformer 16. The combustion gas from a combustion gas path as described later is supplied through the combustion gas inlet 98 to the heat medium channel 94.

The downstream side of the heat medium channel 94 is connected to a heating channel 102 in the evaporator 15 through a connection path 100. The evaporator 15 has an outer cylindrical member 104a and an inner cylindrical member 104b which are coaxial with each other. A dual tube 106 is spirally provided between the outer cylindrical member 104a and the inner cylindrical member 104b. A water channel is provided in the dual tube 106. A raw fuel channel is formed around the water channel. In the dual tube 106, the water channel and the raw fuel channel are connected to each other through a plurality of holes (not shown) formed on the downstream side of the evaporator 15. Water vapor and the raw fuel are mixed together to produce a mixed fuel.

An upstream end of the dual tube 106 extends through the head plate 90 to the outside. A downstream end of the dual tube 106 is connected to one end of a mixed fuel supply pipe 107. The other end of the mixed fuel supply pipe 107 extends toward the fuel cell stack 12, and is connected to an inlet 108 of the reformer 16.

The reformer 16 has an outlet 110 on the downstream side. A reformed gas supply path 112 extends along the axis of the reformer 16. The reformed gas supply path 112 is inserted into a stepped hole 78 of the end plate 70a, and connected to the fuel gas supply passage 30.

An exhaust gas pipe 114 is connected to the head plate 90. The exhaust gas flowing through the heating channel 102 is discharged into the exhaust gas pipe 114. An air supply pipe 116 is connected to the head plate 90. The air supply pipe 116 is connected to a chamber 122 formed inside a wall plate 120 through a channel 118 in the heat exchanger 14. The chamber 122 is connected to the oxygen-containing gas supply unit 67 in the fuel cell stack 12 through the holes 80 of the end plate 70a.

The combustor 17 has a cover 124, and the cover 124 is thin in comparison with the second case unit 84b. The cover 124 is joined to inner circumferential portion of the inner cylindrical member 104b of the evaporator 15. The cover 124 has a semi-hemispheric shape curved toward the reformer 16 and a plurality of holes 126 are formed in the semi-hemispheric portion. A raw fuel supply pipe 128 and an air supply pipe 130 are connected to the cover 124. The raw fuel supply pipe 128 and the air supply pipe 130 extend through the head plate 90 to the outside.

A combustion chamber 132 is provided in the cover 124, and combustion of the raw fuel and the air occurs in the combustion chamber 132. The combustion chamber 132 is connected to a combustion gas path 134 through a plurality of holes 126. The combustion gas path 134 is connected to a combustion gas inlet 98 of the heat exchanger 14. The reformer 16 is provided at a position in the middle of the combustion gas path 134. The combustion gas path 134 connects the combustion gas inlet 98 and the heat medium channel 94. Further, the combustion gas path 134 is connected to the heating channel 102 through the connection path 100 for supplying the combustion gas as a heat source of the evaporator 15.

The load applying mechanism 21 includes a first tightening unit 140a for applying a first tightening load to a region around (near) the fuel gas supply passage 30 and a second tightening unit 140b for applying a second tightening load to the electrolyte electrode assemblies 26. The second tightening load is smaller than the first tightening load.

The first tightening unit 140a includes short first tightening bolts 142a screwed into screw holes 82 formed along one diagonal line of the end plate 70a. The first tightening bolts 142a extend in the stacking direction of the fuel cells 11, and engage a first presser plate 144a. The first tightening bolts 142a are provided in the oxygen-containing gas supply unit 67 extending through the separators 28. The first presser plate 144a is a narrow plate, and engages the central position of the separator 28 to cover the fuel gas supply passage 30.

The second tightening unit 140b includes long second tightening bolts 142b screwed into screw holes 82 formed along the other diagonal line of the end plate 70a. Ends of the second tightening bolts 142b extend through a second presser plate 144b having a curved outer section. Nuts 146 are fitted to the ends of the second tightening bolts 142b. The second tightening bolts 142b are provided in the oxygen-containing gas supply unit 67 extending through the separators 28. Springs 148 and spring seats 150 are provided in respective circular portions of the second presser plate 144b, at positions corresponding to the electrolyte electrode assemblies 26 on the circular disks 36 of the fuel cell 11. For example, the springs 148 are ceramics springs.

Next, operation of the fuel cell system 10 will be described below.

Figure 5:
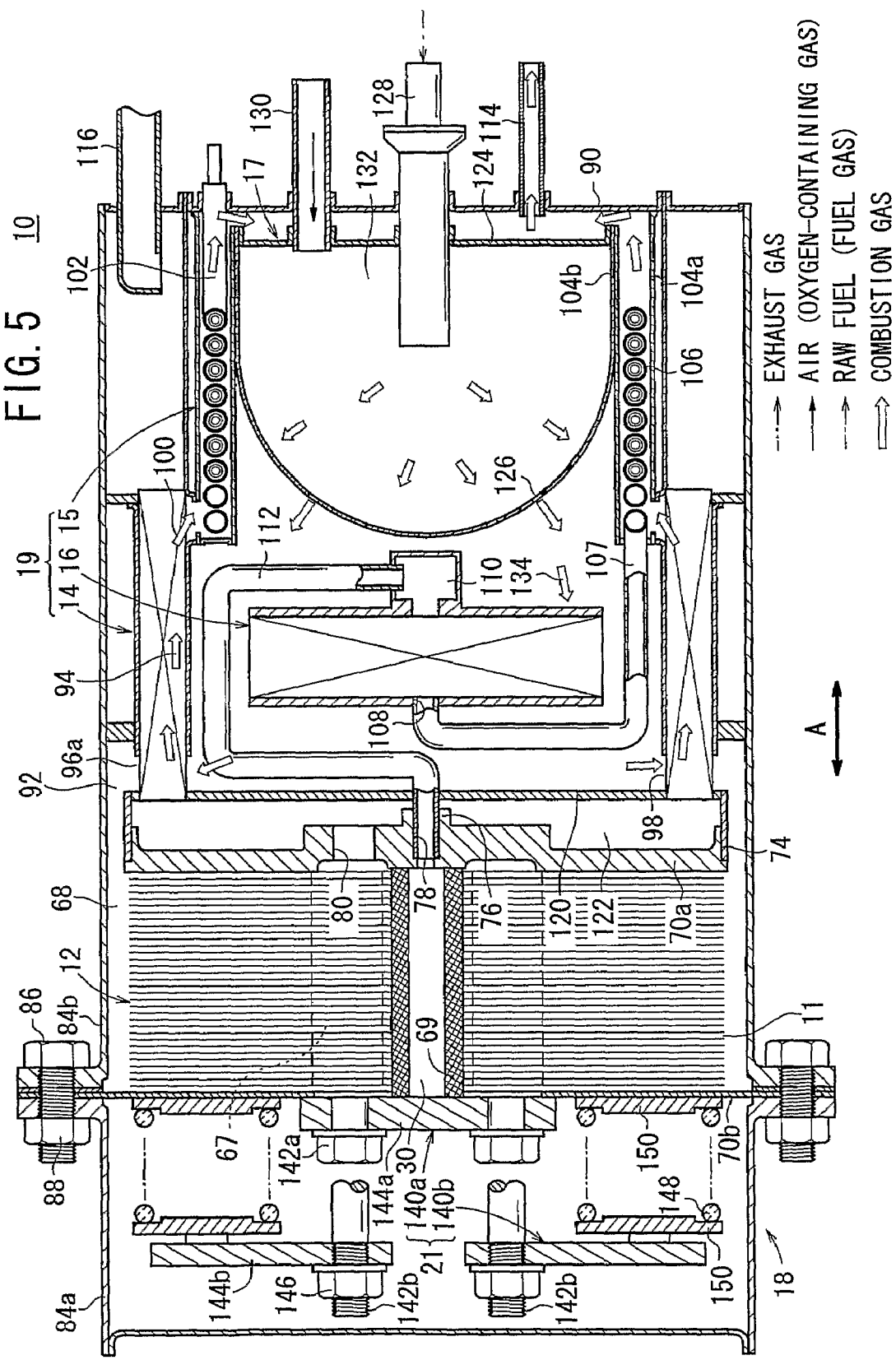
FIG. 5 is a view showing a state of starting operation of the fuel cell system.

Firstly, at the time of starting operation of the fuel cell system 10, combustion by the combustor 17 is started, and then, operation of the fuel cell stack 12 is started. Specifically, as shown in FIG. 5, a raw fuel is supplied to the raw fuel supply pipe 128, and the air is supplied to the air supply pipe 130.

Thus, by combustion in the combustion chamber 132 of the combustor 17, a combustion gas is produced. The combustion gas is supplied from a plurality of holes 126 to the combustion gas path 134. In the middle of the combustion gas path 134, the reformer 16 is provided. After the combustion gas heats the reformer 16, the combustion gas is supplied to the heat medium channel 94 of the heat exchanger 14 from the combustion gas inlet 98.

The combustion gas flows through the heat exchanger 14, and then, flows from the connection path 100 into the heating channel 102 in the evaporator 15. Thus, after the combustion gas flows through the heating channel 102, while heating the evaporator 15, the combustion gas is discharged from the exhaust gas pipe 114.

Then, after the reformer 16 and the evaporator 15 are heated to predetermined temperatures where reforming become possible, as shown in FIG. 1, the raw fuel (methane, ethane, or propane) and water are supplied to the respective channels in the dual tube 106. Further, the oxygen-containing gas (hereinafter also referred to as the air) is supplied to the air supply pipe 116 to start operation of the fuel cell stack 12.

Thus, in the evaporator 15, water is evaporated to produce water vapor. The mixed fuel of the water vapor and the raw fuel flows through the mixed fuel supply pipe 107, and is supplied to the reformer 16. Thus, at the reformer 16, the fuel gas is produced by steam reforming of the raw fuel. The fuel gas flows through the reformed gas supply path 112, and is supplied to the fuel gas supply passage 30 of the fuel cell stack 12. Then, the fuel gas moves in the stacking direction indicated by the arrow A, and flows into the fuel gas supply channel 66 of each fuel cell 11 (see FIG. 4).

The fuel gas flows along the fuel gas supply channel 66 between the first and second bridges 34, 60, and flows into the fuel gas channels 46 from the fuel gas inlets 54 of the circular disks 36. The fuel gas inlets 54 are formed at substantially the central positions of the anodes 24 of the electrolyte electrode assemblies 26. Thus, in each of the electrolyte electrode assemblies 26, the fuel gas is supplied from the fuel gas inlet 54 to substantially the central position of the anode 24, and flows outwardly toward the outer end of the anode 24 along the fuel gas channel 46.

As shown in FIG. 1, the air from the air supply pipe 116 flows through the channel 118 of the heat exchanger 14, and flows temporarily into the chamber 122. Then, the air flows through the holes 80 connected to the chamber 122, and is supplied to the oxygen-containing gas supply unit 67 provided at substantially the center of each fuel cell 11.

In the heat exchanger 14, as described later, the exhaust gas discharged to the exhaust gas channel 68 and the combustion gas heated to a high temperature by the combustor 17 flow through the heat medium channel 94. Therefore, in the heat exchanger 14, heat exchange between the exhaust gas and the combustion gas flowing through the heat medium channel 94 and the air flowing through the channel 118 before consumption is performed. The air is heated to a predetermined fuel cell operating temperature before it is supplied to the fuel cells 11.

The air supplied to the oxygen-containing gas supply unit 67 flows into the space between the inner circumferential edge of the electrolyte electrode assembly 26 and the inner circumferential edge of the circular disk 36 in the direction indicated by the arrow B, and flows toward the oxygen-containing gas channel 50. As shown in FIG. 4, in the oxygen-containing gas channel 50, the oxygen-containing gas flows from the inner circumferential edge (central region of the separator 28) to the other outer circumferential edge (outer circumferential region of the separator 28) of, i.e., from one end to the other end of the cathode 22 of the electrolyte electrode assembly 26.

Thus, in the electrolyte electrode assembly 26, the fuel gas flows from the center to the outer circumferential side on the electrode surface of the anode 24, and the air flows in one direction indicated by the arrow B on the electrode surface of the cathode 22. At this time, oxygen ions flow through the electrolyte 20 toward the anode 24 for generating electricity by electrochemical reactions. The fuel gas from the fuel gas channel 46 after consumption and the air from the oxygen-containing gas channel 50 after consumption are discharged into the exhaust gas channel 68 to produce the hot exhaust gas.

Figure 6:
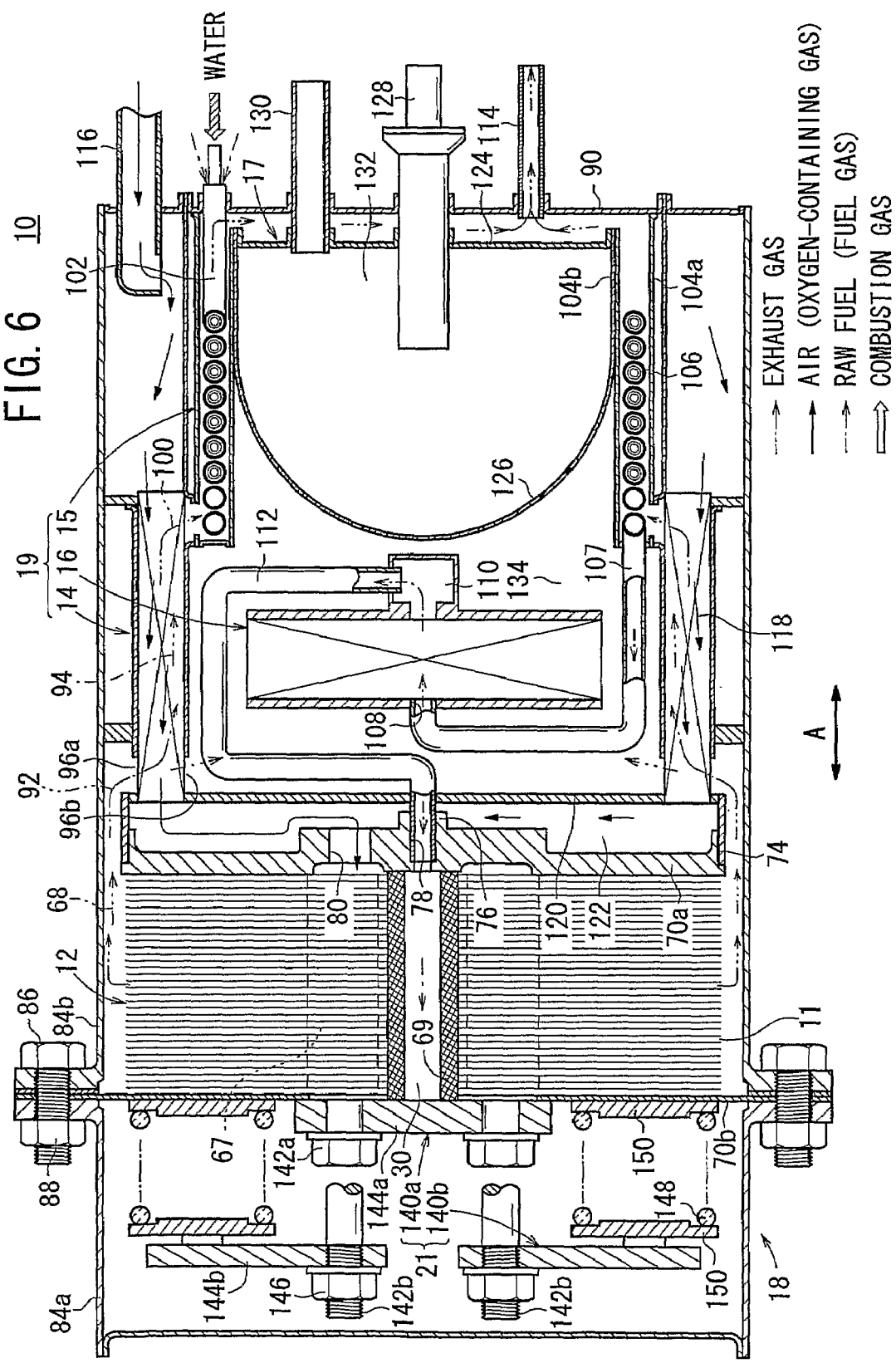
FIG. 6 is a view showing a state where steady operation of the fuel cell system is performed.
Figure 7:
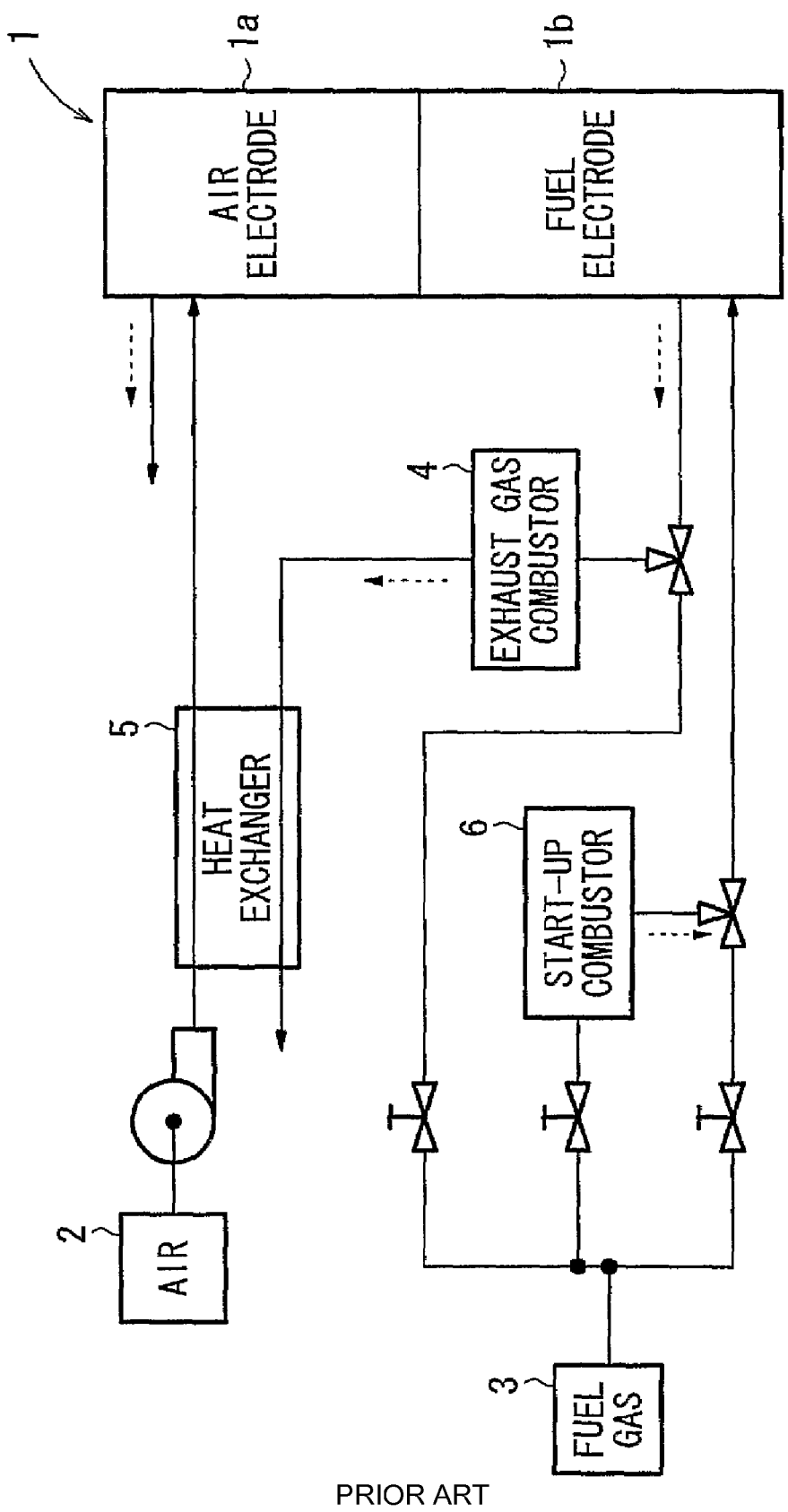
FIG. 7 is a diagram showing a fuel cell system according to Japanese Laid-Open Patent Publication No. 2005-166439.

Then, after the fuel cell stack 12 starts the steady operation, combustion by the combustor 17 is stopped. Thus, as shown in FIG. 6, at the heat exchanger 14, heat exchange between the air supplied from the air supply pipe 116 before reaction and the exhaust gas discharged from the fuel cell stack 12 is performed. After the oxygen-containing gas is heated to the predetermined temperature, the oxygen-containing gas is supplied to the fuel cell stack 12.

The exhaust gas is supplied from the exhaust gas path 92 to the heat exchanger 14, and the part of the exhaust gas is supplied from the exhaust gas outlet 96b to a region near the inlet 108 of the reformer 16. Thus, by steam reforming, the region near the inlet 108 where the temperature tends to be lowered can be locally heated by the hot exhaust gas, and the temperature of the reformer 16 is not lowered significantly.

In the embodiment of the present invention, the combustion gas path 134 for discharging the combustion gas produced at the combustor 17 is provided. The reformer 16 is provided at a position in the middle of the combustion gas path 134. Thus, the reformer 16 is heated rapidly by the hot combustion gas. Further, since the combustor 17 is provided inside the evaporator 15, the evaporator 15 is heated by the heat radiated from the combustor 17.

Accordingly, in the embodiment, the reformer 16 and the evaporator 15 are promptly placed into their active states where reforming can be performed desirably. It is possible to suitably start operation of the fuel cell stack 12.

Further, the fluid unit 19 is provided at one end of the fuel cell stack 12 in the stacking direction, and the combustor 17 is provided inside the evaporator 15 of the fluid unit 19. In the structure, the fuel cell stack 12 is heated from the inside owing to the combustor 17. Improvement in the heat efficiency is achieved advantageously.

Further, heat exchange between the combustion gas and the air is performed at the heat exchanger 14, and the fuel cell stack 12 is heated from the inside by the air. In the structure, the fuel cell stack 12 is heated uniformly and rapidly without any corrosion.

Further, the exhaust gas discharged from the fuel cell stack 12 is supplied from the exhaust gas channel 68 to the exhaust gas path 92, and the combustion gas discharged from the combustor 17 is supplied to the combustion gas path 134. The exhaust gas from the exhaust gas path 92 and the combustion gas from the combustion gas path 134 are supplied to the exhaust gas inlet 96a of the heat exchanger 14 and the combustion gas inlet 98, and merged in the heat medium channel 94.

Therefore, the temperature of the heat medium supplied to the heat exchanger 14 is regulated suitably and accurately, and the combustor 17 is controlled simply and finely at once. Further, durability of the heat exchanger 14 is improved, and the heat exchanger 14 can be designed freely.

Further, the combustor 17 is not exposed to the hot exhaust gas discharged from the fuel cell stack 12, and durability of the combustor 17 is improved advantageously. Moreover, the raw fuel is supplied to the combustor 17 through the raw fuel supply pipe 128, and the air is supplied to the combustor 17 through the air supply pipe 130. The temperatures and the flow rates of the raw fuel and the oxygen-containing gas as the conditions of operating the fuel cell stack 12 can be maintained substantially at certain levels. Accordingly, stable combustion is performed reliably.

The exhaust gas flows through the heat medium channel 94. After the heat exchange, the exhaust gas flows into the heating channel 102 from the connection path 100. The exhaust gas is utilized as a medium for heating the evaporator 15. The hot exhaust gas flows through the heat exchanger 14 for the heat exchange, and the temperature of the exhaust gas is lowered to a relatively low temperature suitable as a heat medium for the evaporator 15. In this manner, the waste heat is utilized suitably, and heat efficiency is improved.

The invention claimed is:

1. A fuel cell system comprising:
 a fuel cell stack formed by stacking a plurality of fuel cells in a stacking direction, said fuel cells each being formed by stacking an electrolyte electrode assembly and a separator, said electrolyte electrode assembly including an anode, a cathode, and an electrolyte interposed between said anode and said cathode;
 a heat exchanger for heating an oxygen-containing gas using a heat medium before the oxygen-containing gas is supplied to said fuel cell stack;
 an evaporator for vaporizing water to produce a mixed fuel of a raw fuel chiefly containing hydrocarbon and water vapor; a reformer for performing steam reforming using the water vapor and the raw fuel to produce a fuel gas to be supplied to said fuel cell stack; and
 a combustor for burning the raw fuel to produce a combustion gas, wherein a fluid unit including at least said heat exchanger, said evaporator, and said reformer is provided at one end of said fuel cell stack in the stacking direction, and said combustor is provided inside said evaporator; and
 said combustor has a combustion gas path for discharging the combustion gas produced in said combustor, and said reformer is provided at a position in the middle of and in contact with said combustion gas path; and
 wherein said combustion gas path is connected to said heat exchanger for supplying the combustion gas after heating the reformer as a heat medium.

2. A fuel cell system according to claim 1, wherein said evaporator is provided on a downstream side of said heat exchanger in the flow direction of the combustion gas; and
 said evaporator has a heating channel for supplying the combustion gas after being used in heat exchange at said heat exchanger as a heat source.

3. A fuel cell system according to claim 1, further comprising an exhaust gas path for supplying an exhaust gas discharged from said fuel cell stack after consumption in power generation reaction to said heat exchanger as the heat medium; and
 said combustion gas path and said exhaust gas path are connected at a heat medium inlet of said heat exchanger.

4. A fuel cell system according to claim 1, wherein said reformer is provided inside said heat exchanger, near said fuel cell stack.

5. A fuel cell system according to claim 1, wherein said fluid unit is provided symmetrically with respect to the central axis of said fuel cell stack.

6. A fuel cell system according to claim 1, further comprising a casing containing at least said fuel cell stack and said fluid unit; and
 a load applying mechanism for applying a tightening load to said fuel cell stack in a stacking direction is provided at the other end of said fuel cell stack in the stacking direction, in said casing.

7. A fuel cell system according to claim 6, wherein said load applying mechanism is provided symmetrically with respect to the central axis of said fuel cell stack.

\* \* \* \* \*